United States Patent [19]

Tribble

[11] Patent Number: 4,940,320

[45] Date of Patent: Jul. 10, 1990

[54] VEHICLE REAR VIEW MIRROR

[76] Inventor: Lura L. Tribble, 1513 Harvard Dr., Brunswick, Ohio 44212

[21] Appl. No.: 377,128

[22] Filed: Jul. 10, 1989

[51] Int. Cl.$^5$ ............................ G02B 7/18; B60R 1/06
[52] U.S. Cl. .................................... 350/616; 350/626; 350/639; 248/480; 248/291; 248/295.1
[58] Field of Search ............... 350/612, 616, 625, 626, 350/631, 632, 639; 248/485, 486, 487, 479, 480, 291, 295.1, 296

[56] References Cited

U.S. PATENT DOCUMENTS

| | | | |
|---|---|---|---|
| 2,413,894 | 1/1947 | Sorensen | 350/616 |
| 2,764,913 | 10/1956 | Green | 350/616 |
| 4,208,104 | 6/1980 | Peterson | 248/487 |
| 4,598,982 | 7/1986 | Levine . | |
| 4,637,694 | 1/1987 | Castandea . | |
| 4,664,489 | 6/1987 | Karns . | |
| 4,695,138 | 9/1987 | Epstein . | |
| 4,728,180 | 3/1988 | Janowicz . | |
| 4,804,257 | 2/1989 | Schmidt et al. | 350/626 |

FOREIGN PATENT DOCUMENTS 0378068  9/1907  France ........................ 350/626

Primary Examiner—Bruce Y. Arnold
Assistant Examiner—R. D. Shafer
Attorney, Agent, or Firm—Jerry T. Kearns

[57] ABSTRACT

A vehicle rear view mirror includes a generally rectangular open frame formed from a cylindrical member. The frame is mounted for compound adjustment with respect to a mounting plate adapted for securement on a vehicle. A pair of mirrors are mounted within the frame for independent compound adjustment with respect to the frame to allow a wide angle rear view and to eliminate blind spots.

3 Claims, 3 Drawing Sheets

VEHICLE REAR VIEW MIRROR

BACKGROUND OF THE INVENTION

1. Field of the Invention

The present invention relates to rear view mirrors, and more particularly pertains to a new and improved vehicle rear view mirror which utilizes a pair of independently adjustable mirrors mounted on a frame which is adjustably secured to a vehicle to provide a wide angle view and to eliminate blind spots. Conventional rear view mirrors allow a straight line view in a single plane which results in a blind spot at which passing cars cannot be seen. In order to overcome this problem, the present invention utilizes a pair of adjustable mirrors which may be oriented in separate planes to provide different viewing angles to eliminate blind spots.

2. Description of the Prior Art

Various types of rear view mirrors are known in the prior art. A tYpical example of such a vehicle rear view mirror is to be found in U.S. Patent 4,598,982, which issued to L. Levine on July 8, 1986. This patent discloses an extendable mirror bracket housing fastened onto the rear view mirror in the interior of a motor vehicle. The bracket housing slidably carries a bracket within an elongated channel. An extension mirror is pivotably fastened by a hinge to the bracket and may be extracted from the channel. U.S. Patent 4,637,694, which issued to A. Castaneda on January 20, 1987, discloses an auxiliary mirror designed to be mounted on the external casing of an existing rear view mirror located outwardly on a side portion of a vehicle. The auxiliary mirror includes a base and connecting structure mounting the auxiliary mirror for adjustment about a plurality of axes in three independent directions. U.S. Patent 4,664,489, which issued to J. Karns on May 12, 1987, discloses an auxiliary mirror system which can be detachably mounted to a vehicle having a primary mirror secured to the vehicle by a frame. The auxiliary mirror is useful when towing wide objects behind the vehicle. U.S. Patent 4,695,138, which issued to D. Epstein on September 22, 1987, discloses a rear view mirror for mounting on the windshield of a vehicle which provides a relatively continuous panoramic rear view. The mirror includes two pivotably mounted end sections which are hingedly connected to a central mirror. U.S. Patent 4,728,180, which issued to M. Janowicz on March 1, 1988, discloses an outside rear view mirror for vehicles which includes a main rear view mirror secured to the vehicle body and an auxiliary mirror stored behind the main mirror and actuated by a motor for movement between operative and storage positions.

While the above mentioned devices are directed to rear view mirrors, none of these devices disclose a pair of mirrors mounted for independent compound adjustment within a generally rectangular open frame formed from a cylindrical member and secured for compound adjustment to a mounting plate adapted for securement on a side portion of a vehicle. Inasmuch as the art is relatively crowded with respect to these various types of rear view mirrors, it can be appreciated that there is a continuing need for and interest in improvements to such rear view mirrors, and in this respect, the present invention addresses this need and interest.

SUMMARY OF THE INVENTION

In view of the foregoing disadvantages inherent in the known types of rear view mirrors now present in the prior art, the present invention provides an improved vehicle rear view mirror. As such, the general purpose of the present invention, which will be described subsequently in greater detail, is to provide a new and improved vehicle rear view mirror which has all the advantages of the prior art rear view mirrors and none of the disadvantages.

To attain this, a representative embodiment of the concepts of the present invention is illustrated in the drawings and makes use of a vehicle rear view mirror which includes a generally rectangular open frame formed from a cylindrical member. The frame is mounted for compound adjustment with respect to a mounting plate adapted for securement on a vehicle. A pair of mirrors are mounted within the frame for independent compound adjustment with respect to the frame to allow a wide angle rear view and to eliminate blind spots.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vehicle rear view mirror which has all the advantages of the prior art rear view mirrors and none of the disadvantages.

It is another object of the present invention to provide a new and improved vehicle rear view mirror which may be easily and efficiently manufactured and marketed.

It is a further object of the present invention to provide a new and improved vehicle rear view mirror which is of a durable and reliable construction.

An even further object of the present invention is to provide a new and improved vehicle rear view mirror which is susceptible of a low cost of manufacture with regard to both materials and labor, and which accordingly is then susceptible of low prices of sale to the consuming public, thereby making such rear view mirrors economically available to the buying public.

Still yet another object of the present invention is to provide a new and improved vehicle rear view mirror which provides in the apparatuses and methods of the prior art some of the advantages thereof, while simultaneously overcoming some of the disadvantages normally associated therewith.

Still another object of the present invention is to provide a new and improved vehicle rear view mirror which provides two independent viewing angles to eliminate rear view blind spots.

Yet another object of the present invention is to provide a new and improved vehicle rear view mirror which includes a pair of mirrors mounted within an open rectangular frame for independent compound adjustment to provide distinct viewing angles to eliminate blind spots and provide a wide angle view.

Even still another object of the present invention is to provide a new and improved vehicle rear view mirror including first and second independently adjustable mirrors mounted in vertically spaced relation within a generally rectangular hollow frame which is secured to a mounting plate for compound adjustment.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
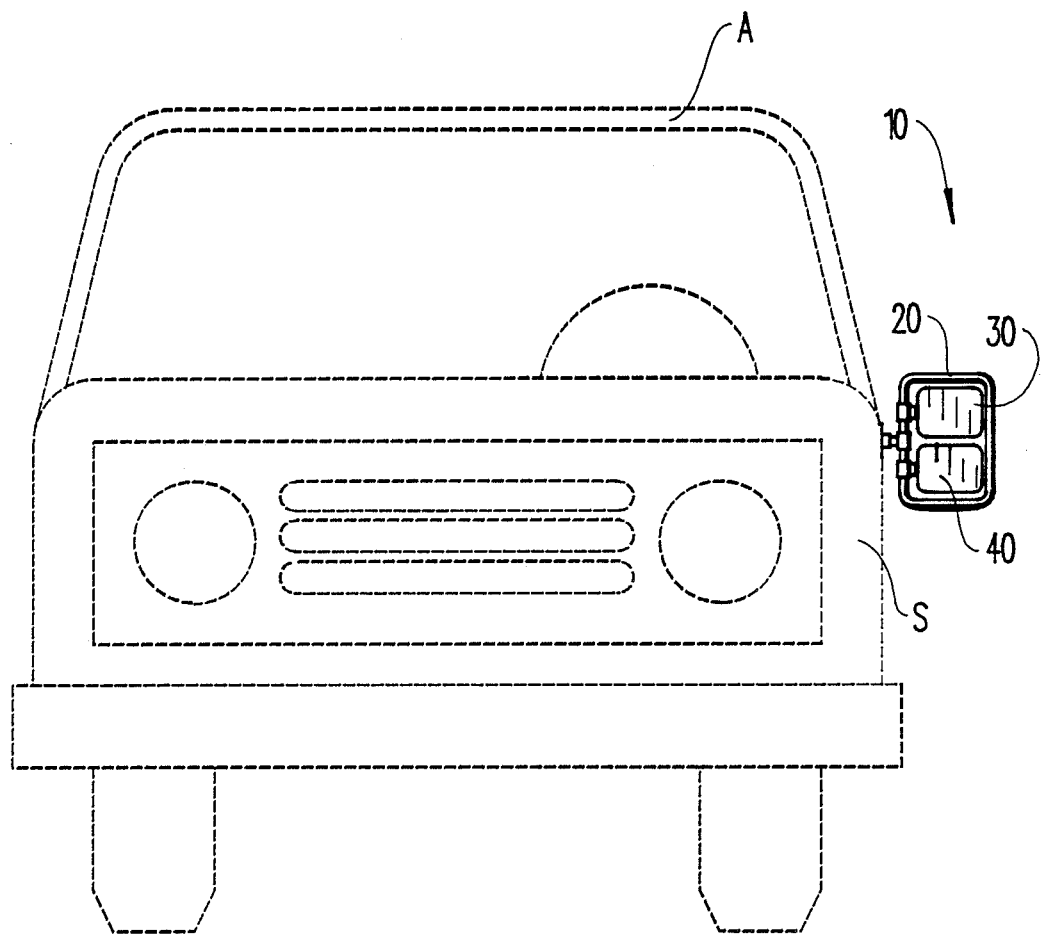
FIG. 1 is an elevational view illustrating the rear view mirror according to the present invention mounted on an exterior side portion of a vehicle.

With reference now to the drawings, and in particular to FIG. 1 thereof, a new and improved vehicle rear view mirror embodying the principles and concepts of the present invention and generally designated by the reference numeral 10 will be described.

More specifically, it will be noted that the first embodiment 10 of the invention includes a frame 20 having an open generally rectangular configuration and preferably formed from a cylindrical member. First 30 and second 40 mirrors are mounted within the frame 20 for independent adjustment. The frame 20 is adapted for securement on an exterior side portion S of an automobile A.

Figure 2:
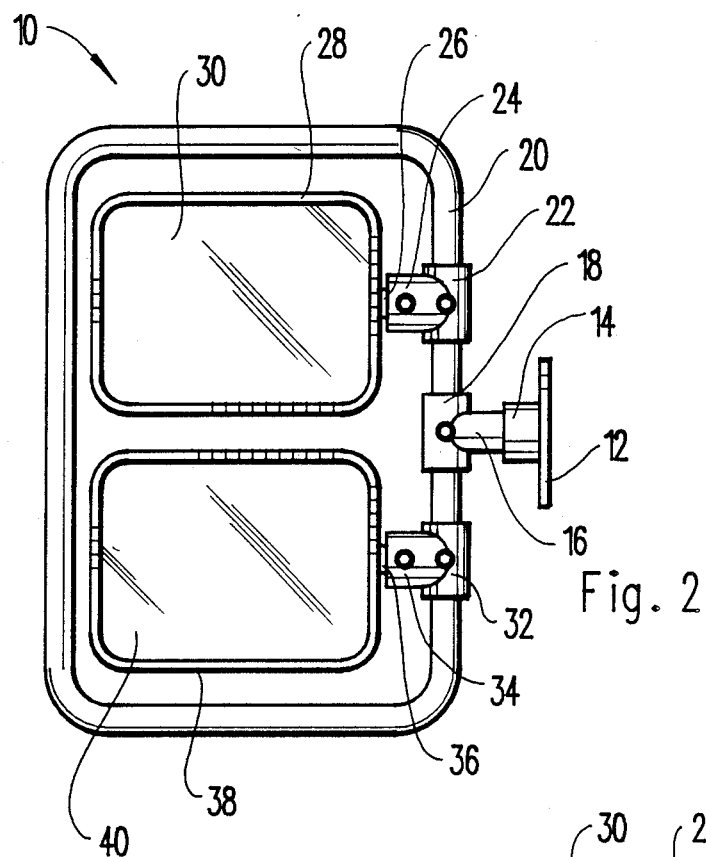
FIG. 2 is an enlarged elevational view illustrating the rear view mirror of the present invention, with two independent mirrors adjusted to a common viewing plane.

As shown in FIG. 2, the mirror assembly 10 includes a first cylindrical sleeve 18 which is adjustably secured by a set screw on the cylindrical frame 20. A first transverse stem 16 is secured to a first cylindrical socket 14 on a mounting plate 12. The mounting plate 12 is adapted for securement utilizing conventional threaded fasteners on an exterior side portion of a vehicle. A second cylindrical sleeve 22 is received on the frame 20, above the first sleeve 18, for vertical and rotational adjustment. A set screw is utilized to lock the sleeve 22 in an adjusted position. The sleeve 22 includes a second cylindrical socket 24 which adjustably mounts a second transverse stem 26 secured to a frame 28 of a mirror 30. A third cylindrical sleeve 32 is received for linear vertical movement and rotation on the frame 20, below the first sleeve 18. The sleeve 32 is secured in an adjusted position by a set screw. A third cylindrical socket 34 adjustably mounts a third transverse stem 36 which is secured to a frame 38 which mounts a second mirror 40. As may now be understood, the entire frame 20 is mounted for adjustment with respect to the fixed mounting plate 12 and the mirrors 30 and 40 are mounted for independent compound adjustment with respect to the frame 20. This affords an extremely wide range of adjustability allowing rear view blind spots to be eliminated and affording a wide angle rear view.

Figure 3:
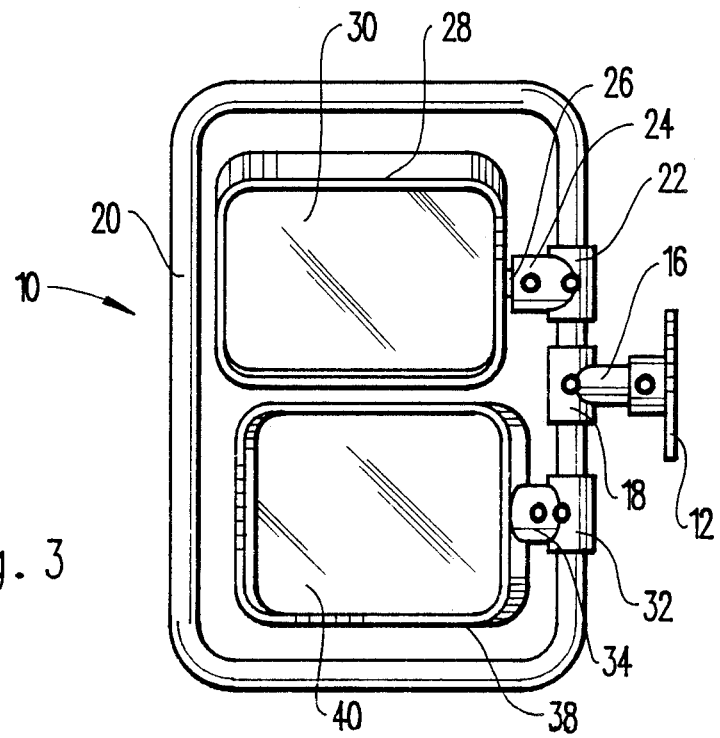
FIG. 3 is an elevational view illustrating the two independent mirrors adjusted to provide different viewing angles.

FIG. 3 illustrates the rear view mirror assembly 10, with the mirrors 30 and 40 adjusted to provide two different viewing angles. It should be noted that the sleeve 22 has been moved downwardly along the frame 20 toward the sleeve 18, as compared with the initial position shown in FIG. 2.

Figure 4:
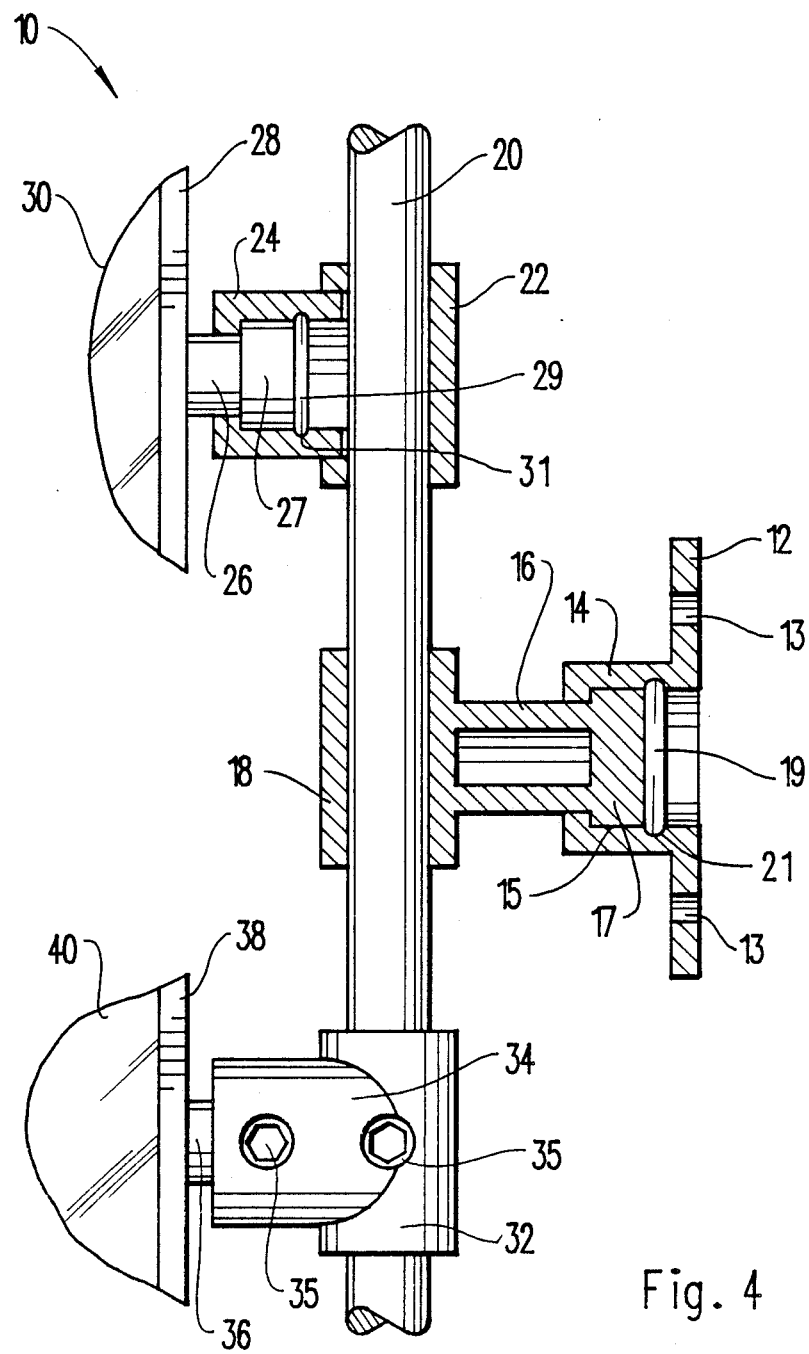
FIG. 4 is an enlarged detail view, partially in cross section, illustrating the compound adjustment mechanisms securing the mirrors to the frame and the frame to a fixed mounting plate.

FIG. 4 is a detail view, partially in cross section, which further illustrates the compound adjustable mounting mechanisms for the mirrors 30 and 40 and for the frame 20. The first transverse stem 16 is secured rigidly to the first cylindrical sleeve 18 and includes an enlarged diameter cylindrical end 17 received within a hollow cylindrical bore 15 within the socket 14. An undercut circular groove 21 is formed in the interior of the socket 14 and is dimensioned for engagement with a resilient circumferential rib 19 formed on the inner end 17 of the stem 16. The resilient rib 19 is in frictional engagement within the groove 21 and allows the stem 16 to be rotated, but requiring a significant force to achieve this rotation. After the stem 16 has been rotated to a desired position, the set screw illustrated in FIGS. 2 and 3 is tightened to lock the enlarged inner end 17 in adjusted position. Similarly, the frame 20 may be rotated or linearly adjusted with respect to the sleeve 18, at which point the set screw is tightened to lock the frame 20 in the adjusted position with respect to the sleeve 18. The mounting plate 12 includes a plurality of apertures 13 adapted to receive conventional threaded fasteners to secure the mounting plate 12 in a fixed position on an exterior side wall of a vehicle.

The second sleeve 22 is similarly mounted on the cylindrical frame member 20 for linear and rotational movement and is secured in an adjusted position by a set screw. The second cylindrical socket 24 receives an enlarged end portion 27 of the second transverse stem 26 which includes a resilient circumferential rib 29 in frictional engagement with a circular undercut groove 31. The outer end of the stem 26 is secured to the frame 28 of a mirror 30. A third cylindrical sleeve 32 is secured below the first sleeve 18 and is secured by a hex-socket headed set screw 35. A third stem 36 has an enlarged diameter inner end secured in a third cylindrical socket 34 by a set screw 35. The interior construction of the stem 36 and socket 34 is identical to that illustrated and described with respect to the stem 26 and the second socket 24. The outer end of the stem 36 is secured to the frame 38 of a mirror 40. Thus, the mirrors 30 and 40 are adjustably mounted within the interior of the frame 20 in spaced vertical relation to provide two independently adjustable viewing planes. The relative adjusted positions of the viewing planes of the mirrors 30 and 40 may be maintained while adjusting the orientation of the entire frame 20 with respect to the fixed mounting plate 12.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A vehicle rear view mirror, comprising:
   a generally rectangular open frame formed from a cylindrical member;
   a first cylindrical sleeve adjustably secured on said cylindrical member;
   a first transverse stem secured to said first sleeve;
   a mounting plate for securement to a vehicle;
   a first cylindrical socket on said mounting plate having an undercut circular groove;
   an enlarged cylindrical end on said first stem received for rotation in said first cylindrical socket;
   an enlarged resilient circumferential rib on said first stem received in said circular groove;
   a second cylindrical sleeve adjustably secured on said cylindrical member above said first cylindrical sleeve;
   a second cylindrical socket on said second sleeve having an undercut circular groove;
   a second transverse stem having an enlarged cylindrical end received for rotation in said second cylindrical socket;
   an enlarged resilient circumferential rib on said second stem received in said circular groove;
   a first mirror mounted within said frame on said second stem;
   a third cylindrical sleeve adjustably secured on said cylindrical member below said first cylindrical sleeve;
   a third cylindrical socket on said third sleeve having an undercut circular groove;
   a third transverse stem having an enlarged cylindrical end received for rotation in said third cylindrical socket;
   an enlarged resilient circumferential rib on said third stem received in said circular groove; and
   a second mirror mounted within said frame on said third stem, said first and second mirrors mounted for independent compound adjustment in vertically spaced relation within said frame.

2. A vehicle rear view mirror, comprising:
   a frame;
   securing means for adjustably securing said frame to a vehicle;
   a mirror;
   a cylindrical sleeve mounted for compound adjustment on said frame;
   a stem mounted for rotation on said sleeve and secured to said mirror;
   a transverse cylindrical socket on said sleeve;
   an undercut circular groove in said socket;
   an enlarged cylindrical end on said stem and received for rotation in said socket; and
   an enlarged circumferential rib on said stem received in said circular groove.

3. The vehicle rear view mirror of claim 2, wherein said circumferential rib is formed from a resilient material and is in frictional engagement with said circular groove.

* * * * *